United States Patent [19]
Watson

[11] 3,876,240
[45] Apr. 8, 1975

[54] STEERABLE TRAILER

[76] Inventor: Don R. Watson, 176 S. Lexington-Spring Mill Rd., Mansfield, Ohio 44906

[22] Filed: June 4, 1973

[21] Appl. No.: 366,499

[52] U.S. Cl. ................................ 280/443; 280/103
[51] Int. Cl. .............................................. B62d 13/04
[58] Field of Search ............................. 280/443, 444

[56] References Cited
UNITED STATES PATENTS

| 2,092,683 | 9/1937 | Stidham | 280/443 |
| 2,100,447 | 11/1937 | Mahaffey | 280/443 |
| 2,533,553 | 12/1950 | Burns | 280/443 |
| 2,539,972 | 1/1951 | Purdy | 280/443 |

Primary Examiner—Leo Friaglia
Attorney, Agent, or Firm—Fay & Sharpe

[57] ABSTRACT

The specification and drawings disclose a steerable four wheel trailer to be pulled behind a towing vehicle having a two ball hitch. The trailer comprises a frame which is connected through springs and shock absorbers to the front axle of the trailer. A tongue is vertically pivotally connected to the trailer frame at its one end and may be releasably secured to one ball of the hitch at its other end. A first steering arm is releasably secured to the other hitch ball such that only the weight of one end of the tongue and one end of the first steering arm need be supported by the two balls of the towing vehicle hitch. At either end of the axle there are steering knuckles having spindle portions to which steerable wheels are rotatably secured. The steering knuckles each have first steering knuckle arms, and these arms are interconnected by a tie rod. One of the steering knuckles has a second steering knuckle arm. A bell crank having legs of different lengths is secured substantially at the pivot connection of the tongue and the frame. A second steering arm interconnects the second steering knuckle arm and the shorter leg of the bell crank. The first steering arm is pivotally secured to the longer leg of the bell crank.

7 Claims, 7 Drawing Figures

STEERABLE TRAILER

BACKGROUND OF THE INVENTION

1. Field of the Invention

This invention relates to that field of art involving steerable towed vehicles.

2. Description of the Prior Art

Typically, in the prior art when it was desired to provide a trailer capable of a steering function, an interconnection between the trailer steering assembly and the towing vehicle was provided which translated a one-to-one turning ratio from the towing vehicle to the trailer wheels. If departure from this ratio was made, it was generally effected in such a way that unnecessary chatter developed in the steering wheels of the towed vehicle. Furthermore, in most of the prior art, trailer designers attached the tongue of the trailer directly to the trailer front axle, thereby necessarily translating unwanted trailer motion to the towing vehicle. Often, the tongue and steering arm arrangement provided in the prior art was difficult to properly align and attach to the towing vehicle.

BRIEF SUMMARY OF THE INVENTION

The instant invention provides a trailer having a frame and front axle with steerable front wheels. The trailer tongue is detachably secured at its one end to the towing vehicle and at the other, it is vertically pivotally secured to the trailer frame. The wheels are interconnected to the towing vehicle by means of a first steering arm which is pivotally secured to the towing vehicle at a point distant from the point of attachment of the trailer tongue. At substantially the point of attachment of the tongue to the frame, a bell crank is provided having legs of unequal length. To the longer leg of the bell crank is attached the other end of the first steering arm. To the shorter end of the bell crank is attached a second steering arm which extends from the bell crank to a steering knuckle arm. Two steering knuckles are provided and are interconnected with a tie rod. One object of the invention is to provide a trailer having four wheel as opposed to two so that very little trailer weight is transferred to the towing vehicle. Another object of the invention is to provide a steering arm and tongue arrangement which is far easier to properly align and attach to the towing vehicle than was the case with prior art trailers. A further object of the invention is to provide a trailer requiring no sway control. A still further object is to provide a steerable feature which saves considerable wear and tear on the trailer tires by prohibiting scuffing. These and other objects of the invention will become apparent upon a reading of the detailed specification and drawings in which:

DETAILED DESCRIPTION OF THE INVENTION

Figure 1:
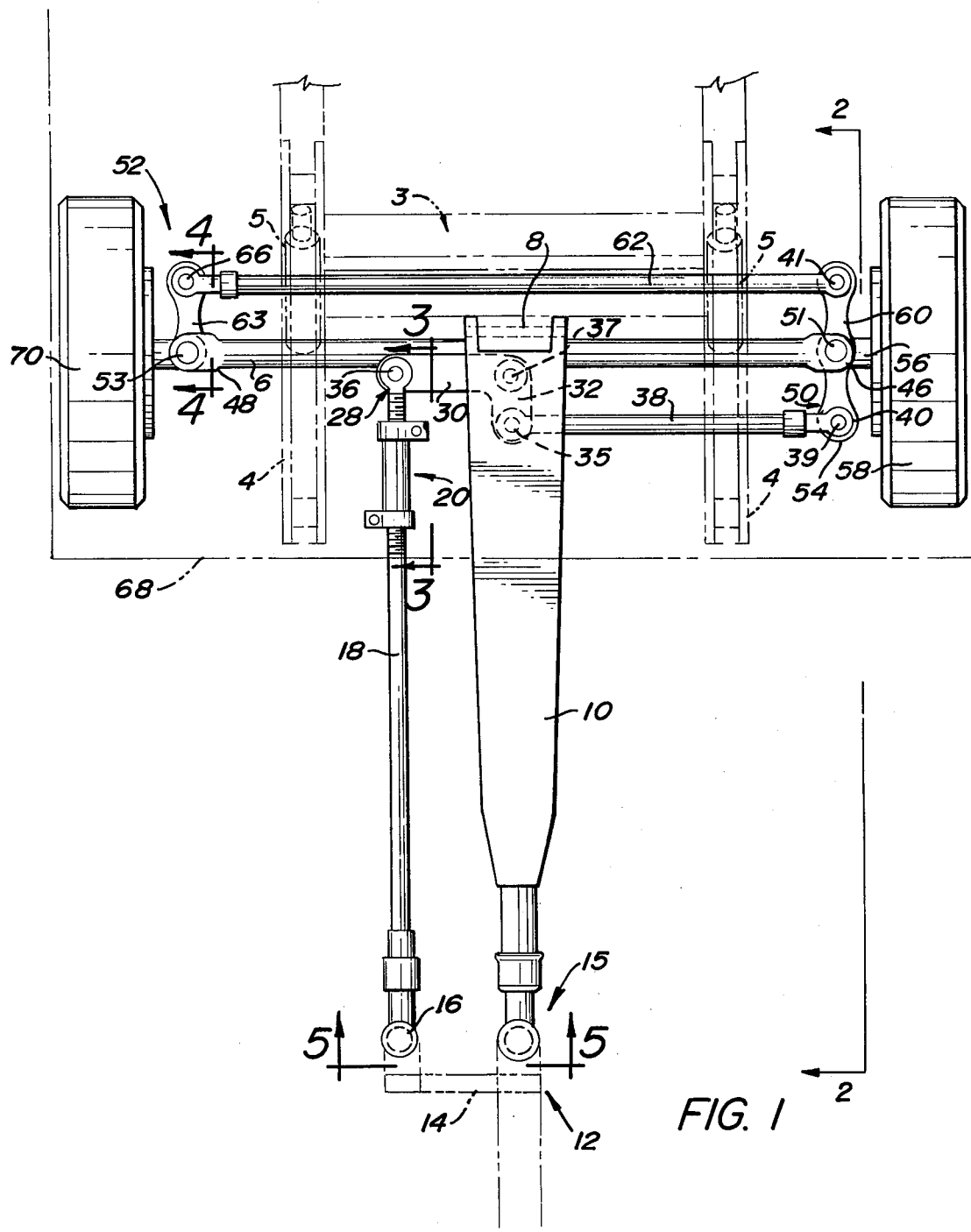
FIG. 1 is a fragmentary top plan view of a towing vehicle hitch and trailer embodying the invention.

Referring now with more particularity to the drawings, it will be seen that in FIG. 1 there is a trailer fragmentarily illustrated at 2. The trailer has an underlying frame illustrated generally at 3 which is connected by means of leaf springs 4 and shock absorbers 5 to a front axle 6. The remainder of the trailer and rear wheels, being of conventional design, are not shown. Vertically pivotally attached to the trailer frame at point 8 is a trailer tongue 10 which extends between the trailer frame and a towing vehicle hitch illustratively shown at 12. The tongue is releasably secured to the hitch by a standard ball and socket connection 15. The hitch also has a horizontal member 14 which supports a second ball 16. Releasably secured to the second ball 16 is a first steering arm 18. The steering arm is provided with an adjustable connector 20 which is used to change the length of the first steering arm as needed to ensure proper trailer wheel alignment when the trailer is connected to a towing vehicle.

Figure 2:
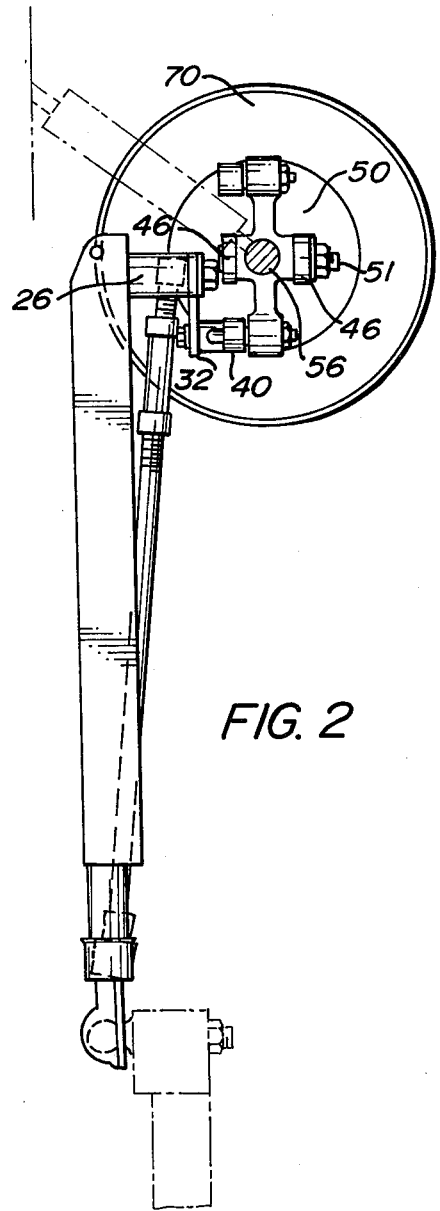
FIG. 2 is a view taken along line 2—2 of FIG. 1.

With reference now to FIG. 2, bell crank support 26 is located just below the point of attachment of the tongue to the frame and substantially vertically in line therewith. Pivotally attached to support 26 is a bell crank 28 which can more clearly be seen in FIG. 1. The bell crank is provided with legs of unequal length, the longer of which is shown at 30 and the shorter of which is shown at 32.

The first steering arm 18 is universally rotatably connected to the longer leg 30 of bell crank 28 by means of ball and socket connection 36. The distance between connection 36 and the pivot joint of the bell crank is substantially equal to the distance between connection 15 and ball 16. Universally pivotally attached to the shorter leg 32 of the bell crank is a second steering arm or connecting rod 38. The second steering arm 38 extends in a line substantially parallel to the vertical plane of axle 6 and terminates with a socket 40.

Figure 4:
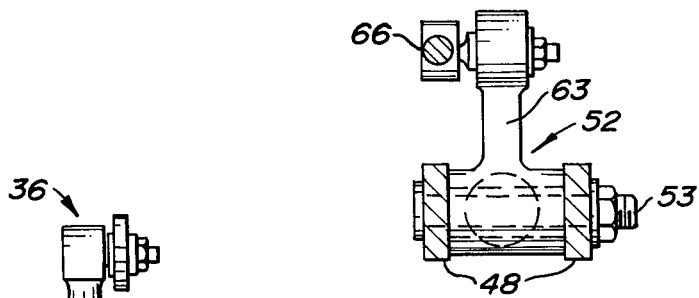
FIG. 4 is an end view of the second steering knuckle taken along line 4—4 of FIG. 1.
Figure 3:
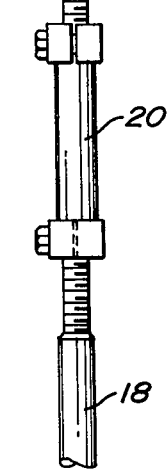
FIG. 3 is a view of the first steering arm attachment to the bell crank taken generally along lines 3—3 of FIG. 1.
Figure 5:
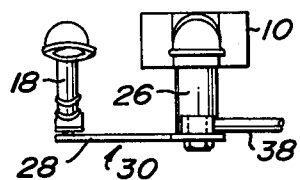
FIG. 5 is a view taken generally along line 5—5 of FIG. 1 showing the tongue, first steering arm and bell crank.

It can be appreciated by scrutinizing FIGS. 2 and 4 that axle 6 terminates at either end in yokes 46 and 48, respectively. Within the yoke 46 a T-shaped steering knuckle or link 50 is pivotally secured by means of king pin 51. L-shaped knuckle or link 52 is pivotally secured by king pin 53. Steering knuckle 50 is provided with a steering knuckle arm. The second steering arm 38 attaches to arm 54 of steering knuckle 50 by means of a ball and socket connection 39 located at a distance from the pivot point of the steering knuckle that is substantially equal to the distance between the pivot point of the bell crank and the point of attachment of the first steering arm to the bell crank. Extending outwardly from the mid-point of steering knuckle 50 is a spindle 56 to which wheel 58 is rotatably secured. Steering knuckle 50 has a steering knuckle arm 60 to which tie rod 62 is secured by means of a ball joint connection 64. Tie rod 62 extends from steering knuckle arm 60 and is attached to steering knuckle arm 63 of steering knuckle 52 by ball joint connection 66. Steering knuckle 52 has a spindle 68 to which wheel 70 is rotatably secured. It should be kept in mind that the desirable turning ratio achieved in the above description can be achieved by using a bell crank having legs of equal length if the distance between positions 35 and 37 is less than the distance between positions 39 and 51.

It can thus be seen that when the tongue and first steering arm are connected to towing vehicle hitch 12, any turning of the towing vehicle will be translated to the wheels of the trailer through steering arm 18, bell crank 30, steering arm 38 and the steering assemblies comprised of the steering knuckles, tie rod and spindles. It will be further noted that turning motion is not translated in a one-to-one ratio due to the unequal lengths of the legs of bell crank 30. It will further be noted that all connections are positive so that no unwanted vibration can be introduced in the steering system. Also of particular note is the fact that the bell crank is secured at substantially the pivot point of the tongue so that a steering function is not introduced to the trailer wheels on bumpy roads or when there is relative vertical motion between the towing vehicle and the trailer. It will readily be appreciated that a four wheel vehicle has advantages over two wheel vehicles from several standpoints, not the least of which is the fact that the only weight on the towing vehicle is the weight of one end of the tongue and first steering arm. Thus, the front axle of the trailer carries substantially all the weight of the front of the trailer. Thus, less consideration need be given to weight distribution inside the trailer. The four wheel trailer, of course, provides a more stable unit than a two wheel trailer since a four point as opposed to a three point suspension is utilized. The advantages of mechanically controlling the trailer instead of physically horsing it about is obvious and tire scuffing, surge, sway and fish tailing are virtually eliminated.

Figure 6:
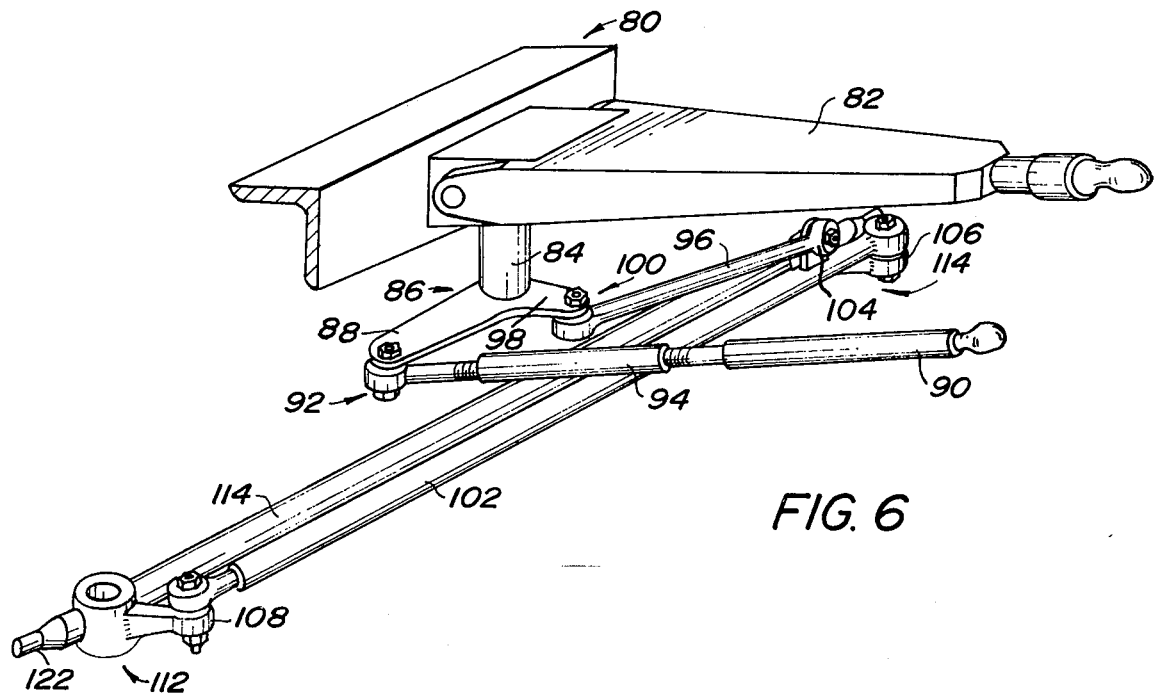
FIG. 6 is an illustrative view of an alternative embodiment of this invention.
Figure 7:
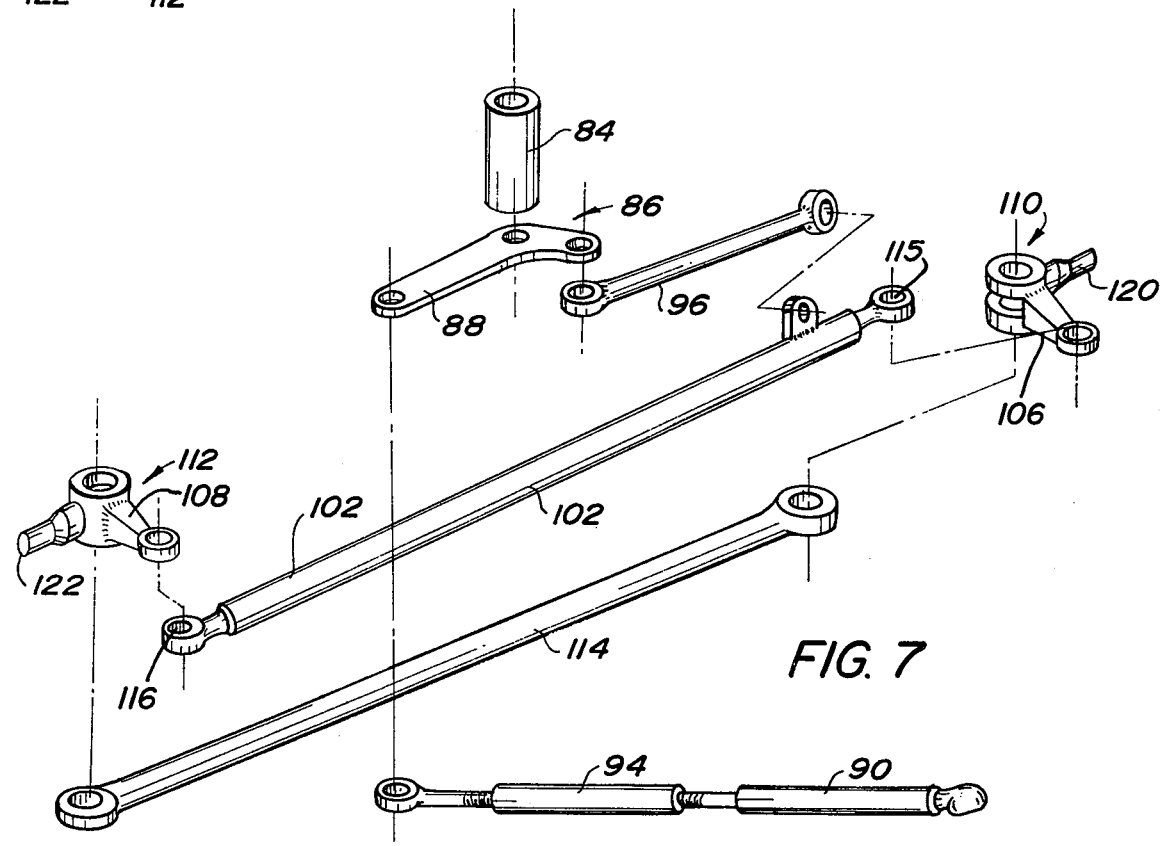
FIG. 7 is a blow-up of the view seen in FIG. 6.

These advantages are retained in the second embodiment of the invention shown in FIGS. 6 and 7 to which the reader's attention is now directed. In FIG. 6, a trailer frame 80 is shown to which a trailer tongue 82 is pivotally attached. Underlying the point of attachment of the tongue to the frame and in substantial vertical alignment therewith, is bell crank support 84. Bell crank 86 is pivotally secured to the bell crank support. It will be noted that the legs of the bell crank are unequal in length. To the longer leg 88 of the bell crank, steering arm 90 is secured by means of a ball and socket connection 92. The first steering arm 90 is provided with an adjusting mechanism 94 for varying the length of the steering arm. In securing the trailer to the hitch of a towing vehicle, the tongue 82 is placed over a first hitch ball and secured thereto. The trailer may then be moved slightly so that the trailer wheels are perfectly straight and then the first steering arm may be adjusted so that it fits over a second hitch ball especially provided for it. The hitch and balls are seen illustratively in the drawings of the first embodiment of the invention. The length of the steering arm is adjusted such that when the trailer is pulled in a straight line, there is no side-to-side pressure exerted on the steering arm connection at the trailer hitch ball. The distance between connection 92 and the pivot joint of the bell crank is equal to the distance between the points of attachment to the hitch of tongue 82 and first steering arm 90.

Referring again to FIGS. 6 and 7, it can be seen that a second steering arm 96 is connected to the shorter leg 98 of bell crank 86 by means of a ball and socket connection 100. The other end of the second steering arm 96 is connected to the tie rod 102 with a ball and socket connection 104. Tie rod 102 interconnects steering knuckle arms 106 and 108 of steering knuckles or links 110 and 112, respectively. It can be seen that in this embodiment, the axle 114 terminates in boss portions 115 and 116 as opposed to the yoke type axle ends illustrated in the first embodiment. Nevertheless, the advantages illustrated in the first embodiment are retained and less than a one-to-one steering ratio is translated from the towing vehicle to the steerable trailer wheels which are attached to steering knuckle spindles 120 and 122.

Having now particularly described two embodiments of my invention, it will be appreciated that it is capable of variation by those having ordinary skill in the art. It is therefore my intention to be restricted only by the scope of the appended claims.

What is claimed is:

1. A towed vehicle having two wheels which turn together as a towing means pulls it through a turn comprising:

a frame and axle assembly;

a tongue having a socket for receiving a ball type hitch of a towing means at one end and being pivotally attached to said frame and axle assembly in a manner permitting movement of the tongue in a vertical plane adjacent its other end;

a bell crank pivotally mounted at a pivot point near the tongue substantially adjacent the point of pivotal attachment of the tongue to said frame and axle assembly, said bell crank having first and second arms extending from said pivot point, one of said arms having a steering arm pivotally attached thereto by means of a ball joint, said steering arm extending outwardly and forwardly toward the towing means and being capable of movement in a vertical plane, the end of said steering arm opposite said bell crank having a recess for receiving a ball type joint attached to said towing means, the other bell crank arm having a connecting rod pivotally attached thereto by means of a ball joint, said connecting rod extending along said axle toward one of said wheels to a first steering link, said first steering link pivotally connected intermediate its ends with said axle and connected at its opposite ends with said connecting rod and tie rod, respectively, by means of ball joint connections, said first steering link further having a journalled passage for receipt of a pivot pin at the end of the axle intermediate said ball joints, the end of said tie rod opposite said first steering link having a ball joint connection with a second steering link, said second steering link being pivotally connected at the end of the axle opposite the end attached to said first steering link, each of said steering links having a wheel supporting projection which by means of their interconnection through the tie rod move together to turn the wheels in unison in response to relative movement between the tongue and the steering arm.

2. A trailer steering mechanism for a trailer having a frame, a tongue pivotable in a vertical plane connected to the frame and a wheel steering assembly comprising:

means for transmitting motion to the wheel steering assembly, at least a portion of said means being attached substantially at the pivot position of the tongue, and at least another portion of said means being operatively connected to said wheel steering assembly;

a steering arm attached to the means for transmitting motion, said arm being adapted to be removably secured to a towing vehicle whereby, when the towing vehicle is turned, less motion is transferred to the wheel steering assembly than is supplied by said arm to the means for transmitting turning motion.

3. A trailer steering mechanism for a trailer having a frame, a tongue vertically pivotally connected to the frame and a front axle comprising:

steerable wheels connected to the ends of the axle, a bell crank having legs of unequal length attached substantially at the pivot position of the tongue, a first steering arm pivotally attached to the longer leg of the bell crank, a second steering arm pivotally attached to the shorter leg of the bell crank at its one end and interconnecting with said steerable wheels at its other end and adapted to effect turning of the wheels.

4. The trailer steering mechanism of claim 3 in which the steerable wheels comprise a spindle and a knuckle arm joined thereto and in which the effective length of the knuckle arms are longer than the effective length of the shorter leg of the bell crank, said arms being interconnected with each other and being adapted to coact with said second steering arm.

5. A trailer having a frame and a front axle with steerable wheels secured at each end thereof, a tongue vertically pivotably attached to the frame, means for imparting steering motion to the wheels secured to the tongue at substantially its pivot position, and means for detachably connecting the means for imparting steering motion to a towing vehicle.

6. A trailer having two wheels which turn together comprising:

a frame and axle assembly;

a tongue having a means for joining with a hitch of a towing means at one end and being pivotally attached to said frame in a manner permitting movement of the tongue in a vertical plane adjacent its other end;

a bell crank mounted at a point on the tongue substantially adjacent the point of pivotal attachment of the tongue to the frame and axle assembly, said bell crank having first and second arms extending from said pivot point, one of said arms having a first steering arm pivotally attached thereto;

said steering arm extending toward the towing means and being capable of movement in a vertical plane;

the end of said first steering arm opposite said bell crank having a means for receiving a universally moveable type fixture of a hitch secured to the towing means;

the other of said bell crank arms having a steering arm pivotally connected thereto;

said second steering arm extending toward a pivotal connection with a tie rod, said tie rod pivotally connecting with a steering knuckle arm for turning a spindle to which is rotatably secured a trailer wheel.

7. A trailer steering mechanism for a trailer having a frame, a tongue vertically pivotally connected to the frame and a front axle comprising:

a bell crank attached substantially at the pivot position of the tongue, a first steering arm pivotally attached to a first leg of the bell crank, a second steering arm pivotally attached to a second leg of the bell crank, and steerable wheels comprising a spindle and knuckle arm connected to the ends of the axle wherein said knuckle arm is longer than said second bell crank leg.

* * * * *